United States Patent [19]
Sakuma et al.

[11] Patent Number: 5,207,501
[45] Date of Patent: May 4, 1993

[54] VANITY MIRROR

[75] Inventors: Toranosuke Sakuma; Atsushi Yamada, both of Shimizu, Japan

[73] Assignee: Koito Manufacturing Co., Ltd., Tokyo, Japan

[21] Appl. No.: 770,018

[22] Filed: Oct. 1, 1991

[30] Foreign Application Priority Data

Oct. 8, 1990 [JP] Japan .................................. 2-269971

[51] Int. Cl.[5] .................................................. B60Q 3/02
[52] U.S. Cl. .................................. 362/137; 362/135; 362/144
[58] Field of Search .................. 362/83.3, 135, 136, 362/137, 142, 144, 155, 156, 288, 295, 394

[56] References Cited
U.S. PATENT DOCUMENTS

| | | |
|---|---|---|
| 4,174,864 | 11/1979 | Viertel et al. . |
| 4,203,149 | 5/1980 | Viertel et al. . |
| 4,213,169 | 7/1980 | Kempkers . |
| 4,227,242 | 10/1980 | Marcus ................... 362/137 |
| 4,364,597 | 12/1982 | Viertel et al. . |
| 4,491,899 | 1/1985 | Fleming . |
| 4,648,011 | 3/1987 | Boote et al. ............... 362/144 |
| 4,764,852 | 8/1988 | Sakuma et al. . |
| 4,909,562 | 3/1990 | Sakuma et al. . |
| 4,914,545 | 4/1990 | Price ......................... 362/155 |
| 4,947,296 | 8/1990 | Takeuchi et al. .......... 362/135 |
| 5,003,438 | 3/1991 | Yoshida ..................... 362/135 |
| 5,022,699 | 6/1991 | Yoshida . |
| 5,029,052 | 7/1991 | Sakuma et al. . |

Primary Examiner—Ira S. Lazarus
Assistant Examiner—Y. Quach
Attorney, Agent, or Firm—Koda and Androlia

[57] ABSTRACT

A vanity mirror of the type including a mirror, an illuminating portion having a lamp, and a cover for covering and exposing the front surface of the mirror, with the lamp being turned on and off in response to opening and closing of the cover, and particularly adapted for incorporating in a sun visor of an automobile. A lens covering the front side of the lamp is displaceable in fore and aft directions, and there is provided a bias mechanism for biasing forward the lens and a mechanism for displacing the lens in response to the closing of the cover. The lens is displaced forward in response to the opening of the cover and by the bias mechanism, thus, the affect of the heat of the lamp on the lens can be minimized.

4 Claims, 12 Drawing Sheets

VANITY MIRROR

BACKGROUND OF THE INVENTION

This invention relates to a vanity mirror of the type being mounted particularly on a sun visor of a motor vehicle.

Particularly, the vanity mirror of the present invention is of the type including a mirror, an illuminating portion having a lamp, and a cover for covering and exposing the front surface of the mirror.

Various proposals have been made with respect to vanity mirrors mounted on sun visors of motor vehicles and of the type including a mirror, an illuminating portion having a lamp, and a cover for covering and exposing the front surface of the mirror.

It is strongly required to reduce the thickness of the sun visor for increasing the inner space of the vehicle and improving the living condition in the vehicle. Accordingly, it is also required to reduce the thickness of the vanity mirror. There is a problem in reducing the thickness of the vanity mirror that the lens of the illuminating portion has usually been formed of polycarbonate resin material which shows a tendency to deform due to the heat of the lamp. Thus, it has been required to provide a predetermined space between the lens and the lamp which has defined a limit for reducing the thickness of the vanity mirror.

SUMMARY OF THE INVENTION

According to the invention, there is provided a vanity mirror of the type including a mirror, an illuminating portion having a lamp, and a cover for covering and exposing the front surface of the mirror, with the lamp being turned on and off in response to opening and closing of the cover, wherein a lens covering the front side of the lamp is displaceable in fore and aft directions, and there is provided means for biasing forward the lens and means for displacing the lens in response to the closing of the cover, whereby the lens is displaced forward in response to the opening of the cover and by the biasing means.

Thus, according to the invention, when the lamp is turned on the lens moves forward thereby separating from the lamp and, when the lamp is turned off the cover is closed and the lens is moved toward the lamp thereby reducing the thickness of the vanity mirror to the minimum.

According to another feature of the invention, the lens is formed as a portion of a switch controlling the on-off of the lamp, such that when the lens moves rearward the lamp is turned off and when the lens moves forward the lamp is turned on.

Preferably, there is provided on the lens a pressing portion for actuating and deactuating the switch for controlling the lamp.

Preferably, the switch for controlling the lamp is constituted of a contact point formed on a printed circuit board supporting the lamp and a contact point provided on the lens.

Preferably, the contact point provided on the lens is formed of a sheet spring material for acting also as biasing means.

Preferably, the sheet spring material provided on the lens and acting as the contact point has inclined and separating two leg potions such that when the lens separates from the printed circuit board the tip ends of the leg portions approach with one another and contact respectively with contact points provided on the printed circuit board and make a circuit and that when the lens approaches to the printed circuit board the tip ends of the leg portions separate from each other whereby at least one of the tip ends separates from at least one of the contact points on the printed circuit board and the biasing force acts on the lens.

These and other features, advantages and objects of the present invention will become apparent upon reading the following description together with reference to drawings, in which:

BRIEF DESCRIPTION OF THE DRAWINGS

FIG. 1 through FIG. 7 show a vanity mirror according to a first embodiment of the invention;

FIG. 8 through FIG. 10 show a modified switch portion according to the present invention;

DETAILED DESCRIPTION OF PREFERRED EMBODIMENTS

The details of the vanity mirror according to the invention will now be explained with reference to the embodiments shown in the drawings.

A. Outline of Sun Visor (FIG. 11)

Figure 11:
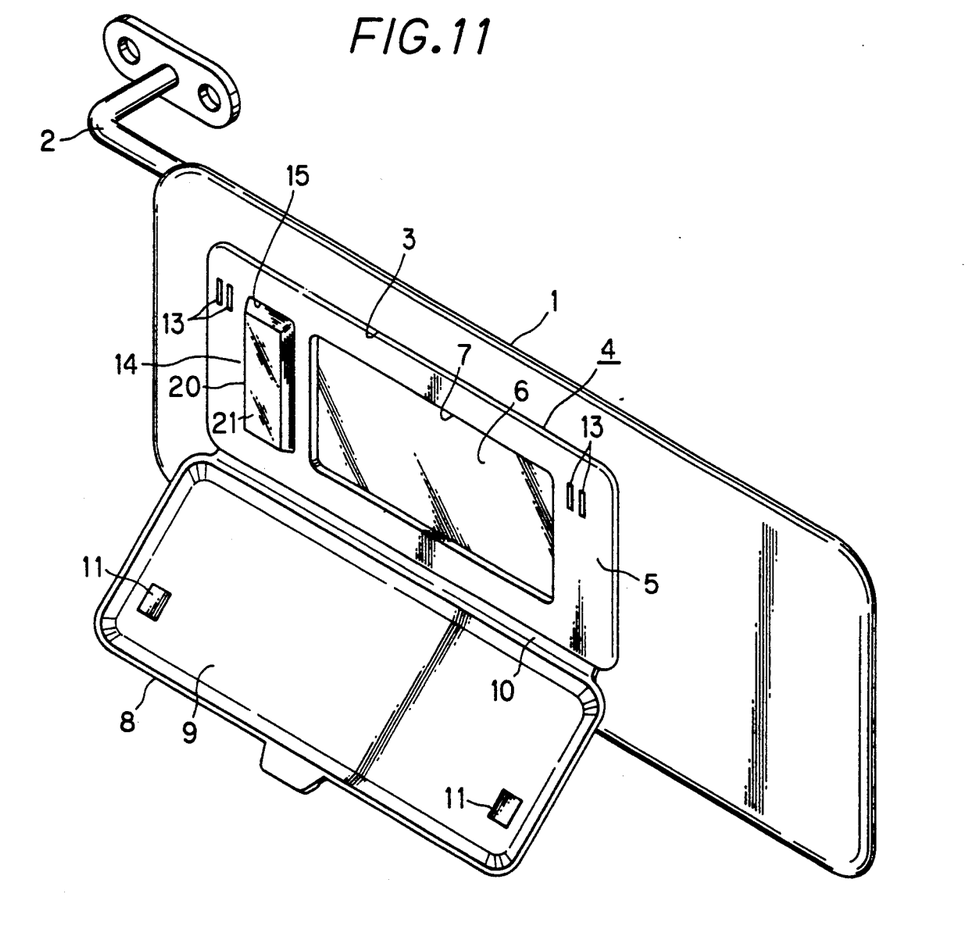
FIG. 11 is a schematic perspective view of a sun visor having a vanity mirror.

Shown at numeral 1 in FIG. 11 is a sun visor mounted in a driver's compartment of a motor vehicle, with one side edge of the sun visor 1 is rotatably supported on a supporting bar 2, and one end of the supporting bar 2 is supported on a frame of the motor vehicle not shown in the drawing.

In one side surface of the sun visor 1, there is formed a generally oblong recess 3, and a vanity mirror 4 is fitted in the recess 3.

B. Vanity Mirror (FIG. 1 through FIG. 8)

B-1. Body, Mirror and Cover

Shown at numeral 5 is a body usually formed of suitable synthetic resin material such as ABS, PET and the like, and has a transversely elongated oblong configuration.

A mirror 6 is mounted on and near to one side of the body 5, and a window 7 is formed in the body 5 for exposing the front surface of the mirror 6 therethrough.

Shown at numeral 8 is a cover for exposing and covering the front surface of the body 5 and has a main portion 9 of an oblong configuration with the size covering completely the front surface of the body 5. The upper edge portion of an integral type flexible hinge portion 10 projecting from the upper edge of the main portion 9 is secured to the lower edge portion of the rear surface of the body 5. Thus, the main portion 9 of the cover 8 can be folded upward through the flexible hinge portion 10 such that the cover 8 can completely close the front surface of the body 5.

Figure 1:
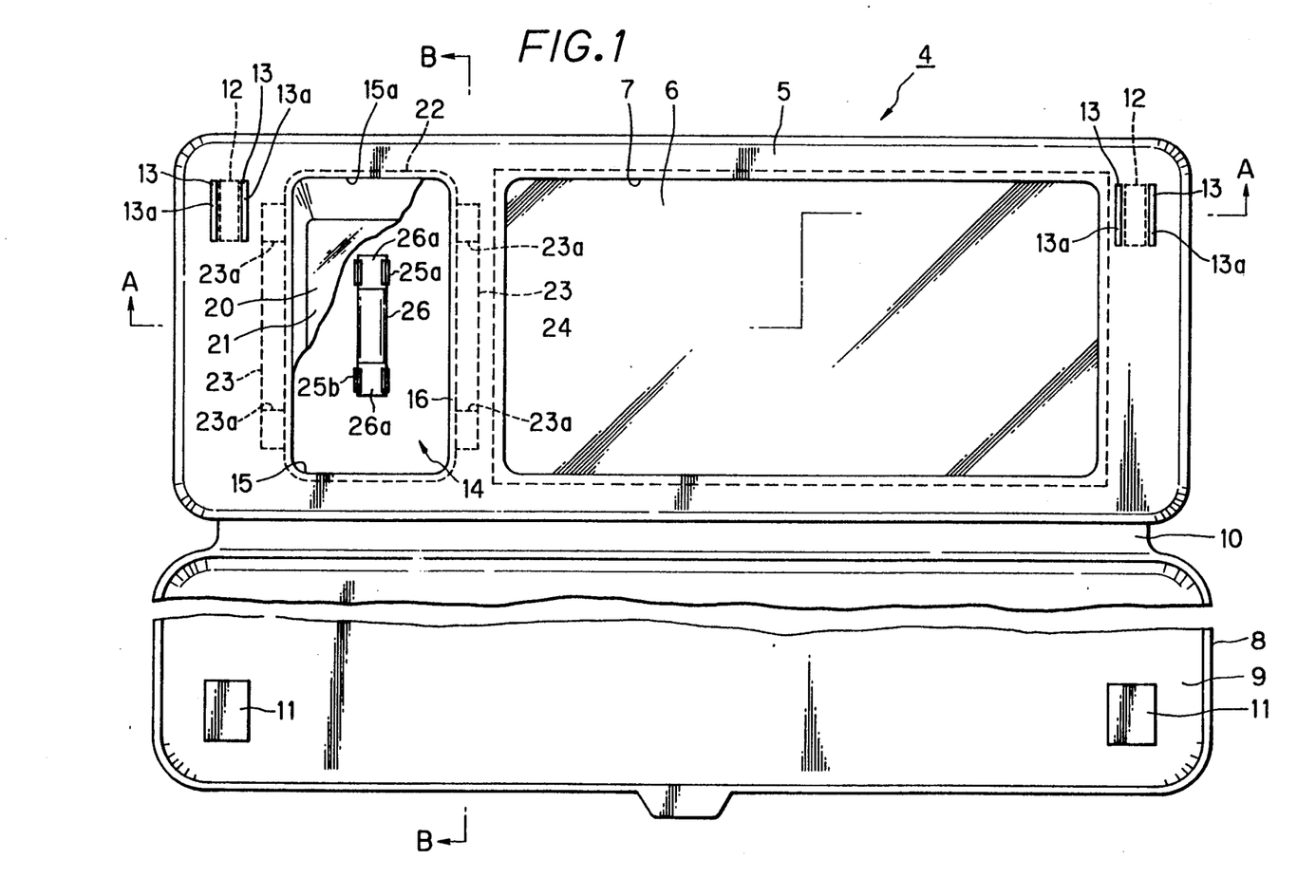
FIG. 1 is a partially broken front view showing the open or usage condition of the vanity mirror.

Shown at numerals 11 and 11 are attaching pieces being formed of magnetic material and mounted on the cover 8, and cooperate with the front end portions 13a, 13a, ... of yokes 13, 13, ... which contact respectively with magnets 12 and 12. The front end portions 13a, 13a, ... of the yokes 13, 13, ... are exposed on the front surface of the body 5 as shown in FIG. 1.

When the cover 8 takes the closed condition, the attaching pieces 11 and 11 contact respectively with front end portions 13a, 13a, ... of the yokes 13, 13, ... and the cover 8 is retained in the closed condition.

B-2. Illuminating Portion

An illuminating portion 14 is provided near to one side edge of the mirror 6.

A vertically elongated oblong opening 15 is formed in the body 5 and near to one side edge of the mirror 6. An inward projecting edge 16 is formed on and around the front edge of the opening 15.

Vertically elongated recess portions 17 and 17 are formed in left and right side portions of the rear side edges of the opening 15, and the front ends of the recess portions 17 and 17 merge respectively in the rear surface of the edge 16. Namely, the front ends of the recess portions 17 and 17 and the rear surface of the edge 16 are in the same plane.

Figure 4A:
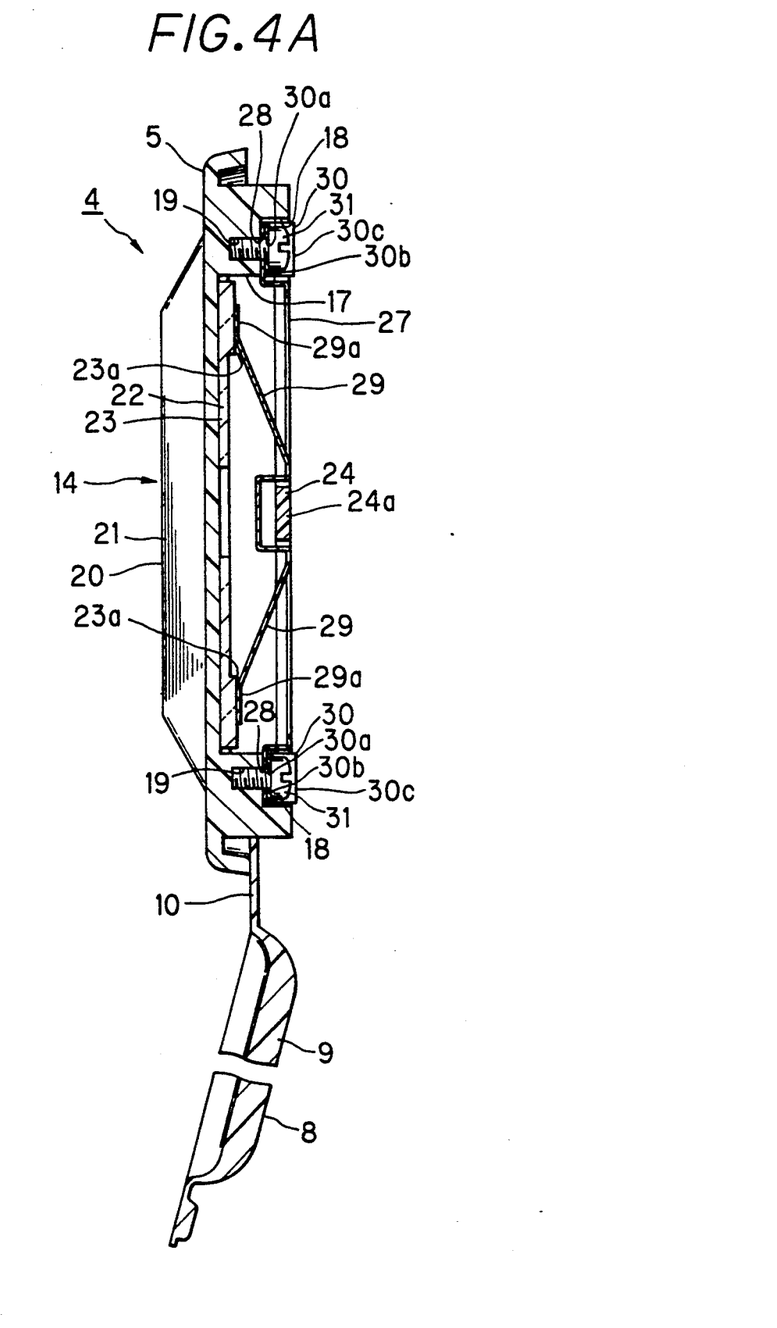
FIG. 4 is a section view taken along line B—B in FIG. 1, with FIG. 4(A) being in the open condition and FIG. 4(B) in the closed condition.

Relatively shallow cutouts 18, 18, ... are formed in the upper and lower and left and right edges of the rear edge of the opening 15, and screw thread holes 19, 19, ... are formed respectively in the cutouts 18, 18, ... as shown clearly in FIG. 4A.

Shown at numeral 20 is a lens consisting integrally of a shallow dish shaped main portion 21, a flange 22 projecting outward from the rear edge of the main portion 21, and pressed pieces 23 and 23 projecting in the left and right directions from the left and right edges of the flange 21. The lens 20 is formed of synthetic resin material such as polycarbonate resin. Further, there are formed integrally projecting portions 23a, 23a, ... on the rear surfaces of the upper and lower end portions of the pressed pieces 23 and 23.

The lens 20 is inserted into the opening 15 in the body 5 from the rear side, such that the main portion 21 projects forward through the front opening 15a of the opening 15, the flange 22 abuts with the rear surface of the edge 16, and the pressed pieces 23 and 23 are located on the front end portions of the recess portions 17 and 17 respectively.

Shown at numeral 24 is a printed circuit board of vertically elongated oblong shape, with the size of which being slightly larger than the front opening 15a of the opening 15. There are provided vertically spaced lamp holders 25a and 25b on the front surface of the board 24. The lamp holders 25a and 25b are adapted to retain respectively terminals 26a and 26a being provided on opposite ends of a tubular lamp 26.

The left and right and upper and lower side edge portions of the printed circuit board 24 mounting thereon the lamp 26 is fitted in cutouts 18, 18, ... in the body 5, and the lamp 26 faces the main portion 21 of the lens 20.

Shown at 27 and 27 are lens retaining springs.

Figure 4B:
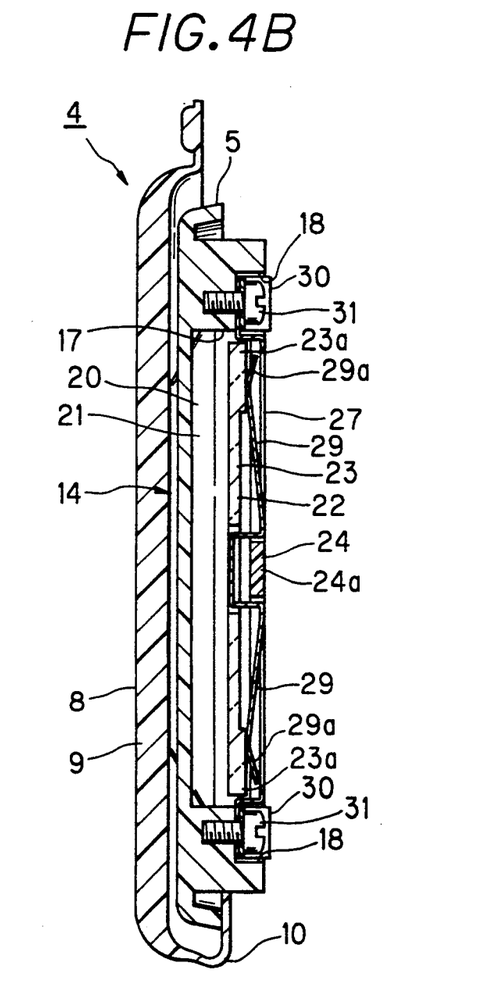

Each spring 27 is formed of a material of sheet spring, and has vertically elongated shape with the length being slightly larger than the length of the recess 17 in the body 5. The upper and lower end portions of each spring 27 are bent in crank form as shown in FIG. 4(A), and have mounting screw receiving openings 28 and 28 respectively.

Figure 2:
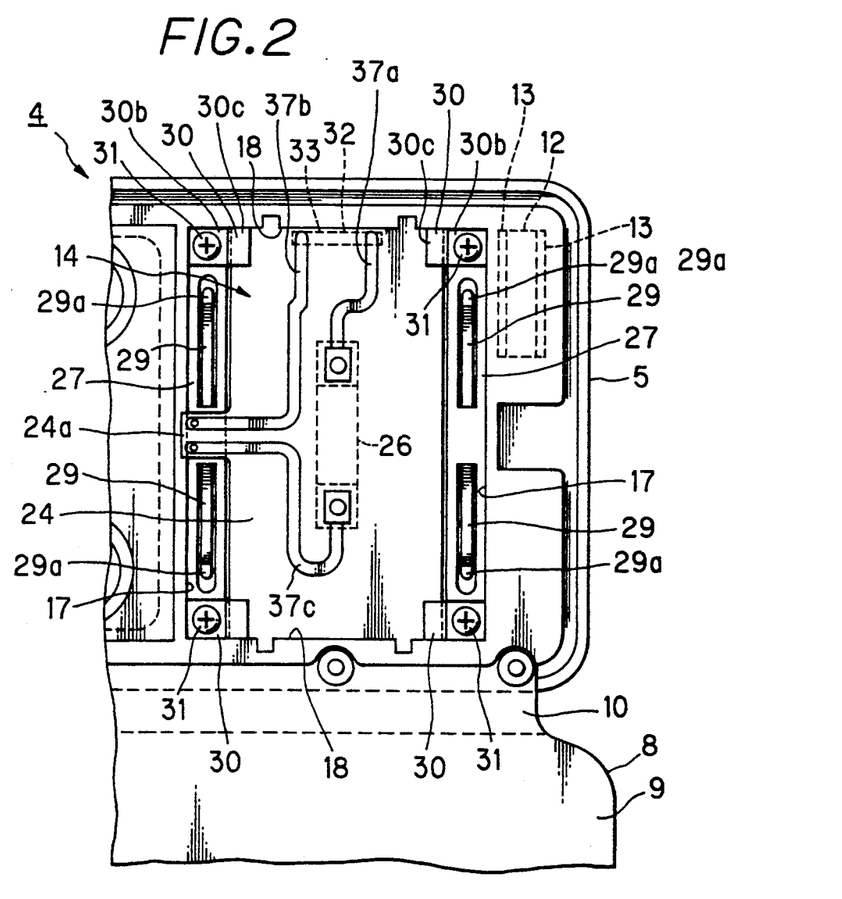
FIG. 2 is a rear view of illuminating portion.
Figure 3:
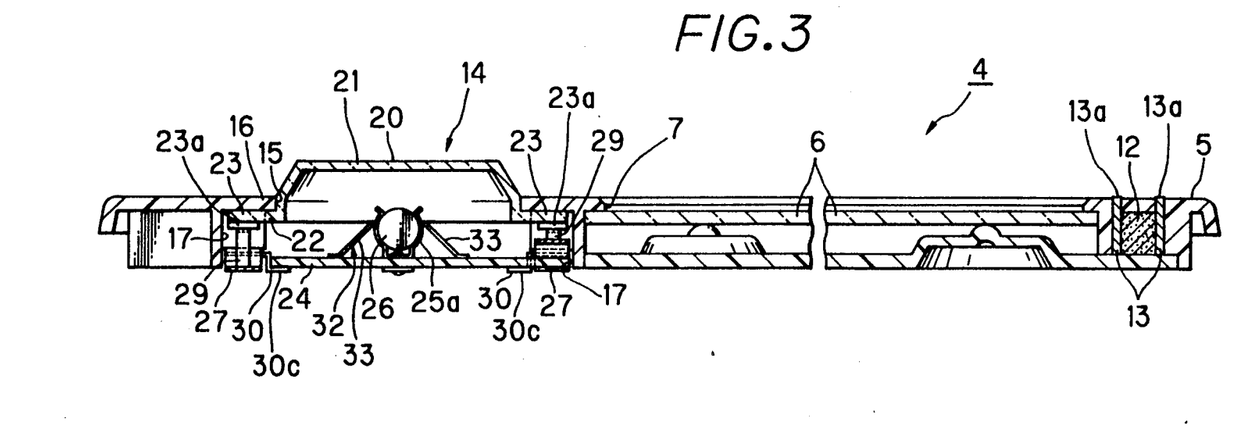
FIG. 3 is a section view taken generally along line A—A in FIG. 1.

Each spring 27 is formed to have generally U-shape cut grooves to define resilient arms 29 and 29 as shown in FIGS. 2 and 4(A). The upper arm 29 inclines upward and forward and the lower arm 29 extends in downward and forward direction. The tip end portions of respective arms 29 are bent in the vertical direction.

Shown at 30, 30 ... are retaining pieces formed of sheet metal material, and consisting integrally of main portions 30b, 30b, ... having therein inserting holes 30a, 30a, ... and, retaining portions 30c, 30c, ... projecting respectively from the main portions 30b, 30b, ... as shown in FIG. 2.

Mounting screws 31, 31, ... are mounted through the inserting holes 30a, 30a, ... in the retaining pieces 30, 30 ... and through the mounting screw receiving openings 28 and 28 in the lens retaining springs 27 and 27, and threaded into respective screw thread holes 19, 19, ... in the body 5 respectively. Thus, the lens retaining springs 27 and 27 are secured to the body 5, and the retaining portions 30c, 30c, ... of the retaining pieces 30, 30, ... are abut respectively with the rear surface of the printed circuit board 24 thereby preventing the board 24 from escaping out or from moving around, and the printed circuit board 24 is secured to the body 5.

The tip end portions 29a, 29a, ... of resilient arms 29, 29, ... of the lens retaining springs 27 and 27 resiliently abut with the rear surfaces of projecting portions 23a, 23a, ... of pressed pieces 23 and 23 of the lens 20, whereby the lens 20 is urged forward, thus, the flange 22 of the lens 20 is pressed against the receiving edge 16 of the body 5, and the main portion 21 of the lens 20 projects substantially through the front opening 15a of the body 5.

When the cover 8 takes the closed condition, the attaching pieces 11 and 11 of the cover 8 are attached to the front end portions 13a, 13a, ... of the yokes 13, 13, ... being supported on the body 5. Thus, the cover 8 presses the front surface of the main portion 21 of the lens 20. The lens 20 moves rearward against the resilient force of the resilient arms 29, 29, ... of lens retaining springs 27 and 27 until the front surface of the main portion 21 of the lens 20 is displaced to the plane defined by the front surface of the body 5. The lens 20 takes a retracted position. The resilient arms 29, 29, ... of lens retaining springs 27 and 27 are deflected rearward and a large resilient force is stored in the resilient arms 29, 29, ... of the lens retaining springs 27 and 27. Thus, when the cover 8 is moved to the open condition, the lens 20 moves to the projecting position due to the resilient force stored in the springs 27 and 27.

Shown at numeral 32 is a switch for controlling on/off of the lamp 26, and consists of a terminal spring 33 and printed conductors 37a, 37b and 37c.

The terminal spring 33 is formed of a sheet spring material and has integrally a mounting portion 34, and leg portions 35a and 35b extending from left and right ends of the mounting portion in the rearward and left and right directions (FIG. 7) to separate from each other. Tip ends 36a and 36b of the leg portions 35a and 35b are bent in the direction separating from each other to constitute contacting portions.

The mounting portion 34 of the terminal spring 33 is secured to the upper rear surface of the flange 22 of the lens 20 and at the central location in left and right directions.

The printed conductors 37a, 37b and 37c are formed on the printed circuit board 24.

One end of the printed conductor 37a is connected to the upper lamp holder 25a and the other end thereof is located near to the upper edge of the printed circuit board 24. One end of the printed conductor 37b is located near to the upper edge of the printed circuit board 24 and spaced from the other end of the printed conductor 37a, and the other end thereof is located on a connector piece 24a which projects from the central portion in the vertical directions and near to the upper edge of the printed circuit board 24. One end of the printed conductor 37c is connected to the lower side lamp holder 25b, and the other end of the printed conductor 37c is located on the connector piece 24a and slightly spaced from the other end of the printed conductor 37b. The end portions of respective printed conductors 37b and 37c located on the connector piece 24a are connected to the electric source (battery) through connecting means such as cords, connectors and the like not shown in the drawings.

Figure 5A:
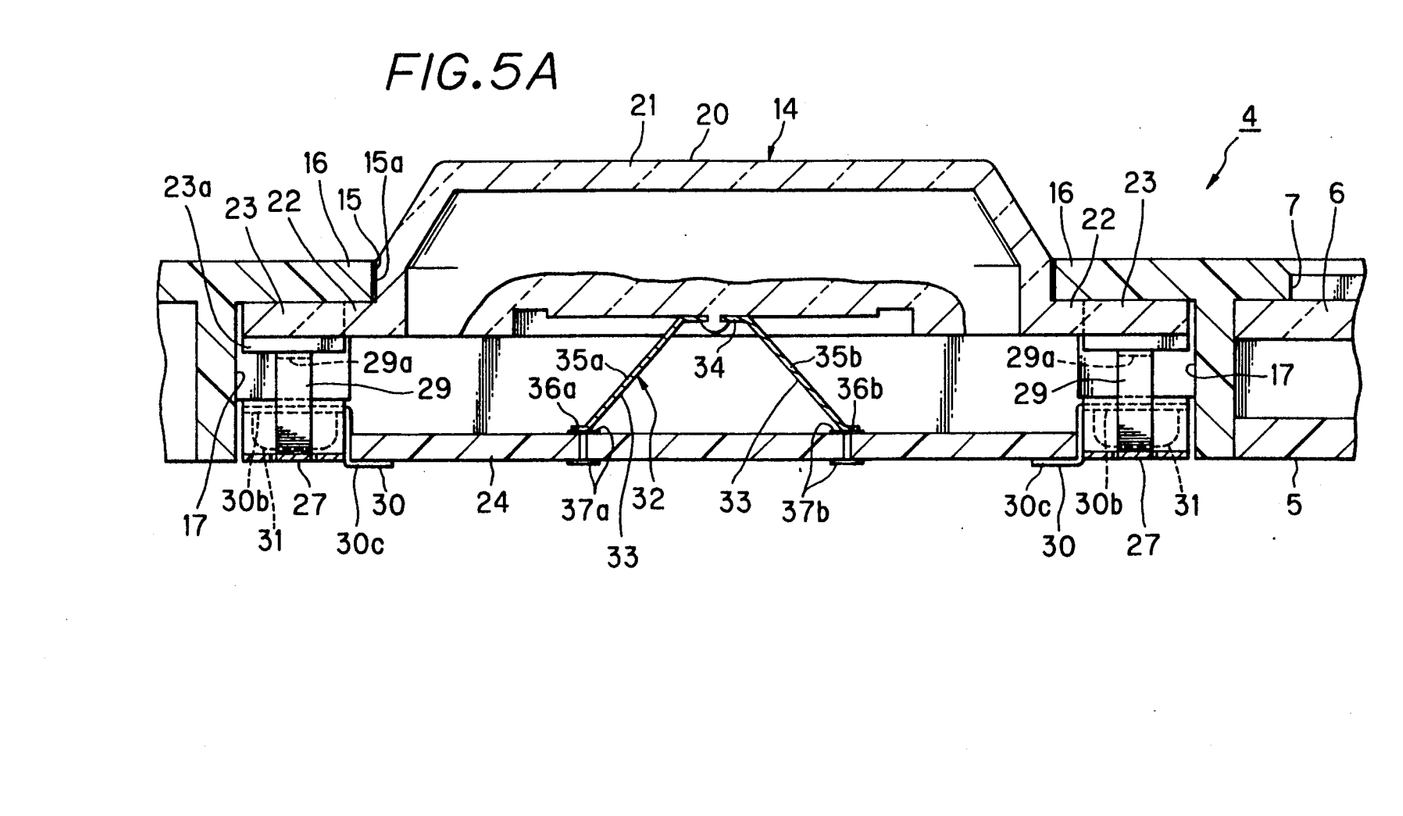
FIG. 5 is an enlarged section view of essential portion, with FIG. 5(A) being in the open condition and FIG. 5(B) in the closed condition.
Figure 5B:
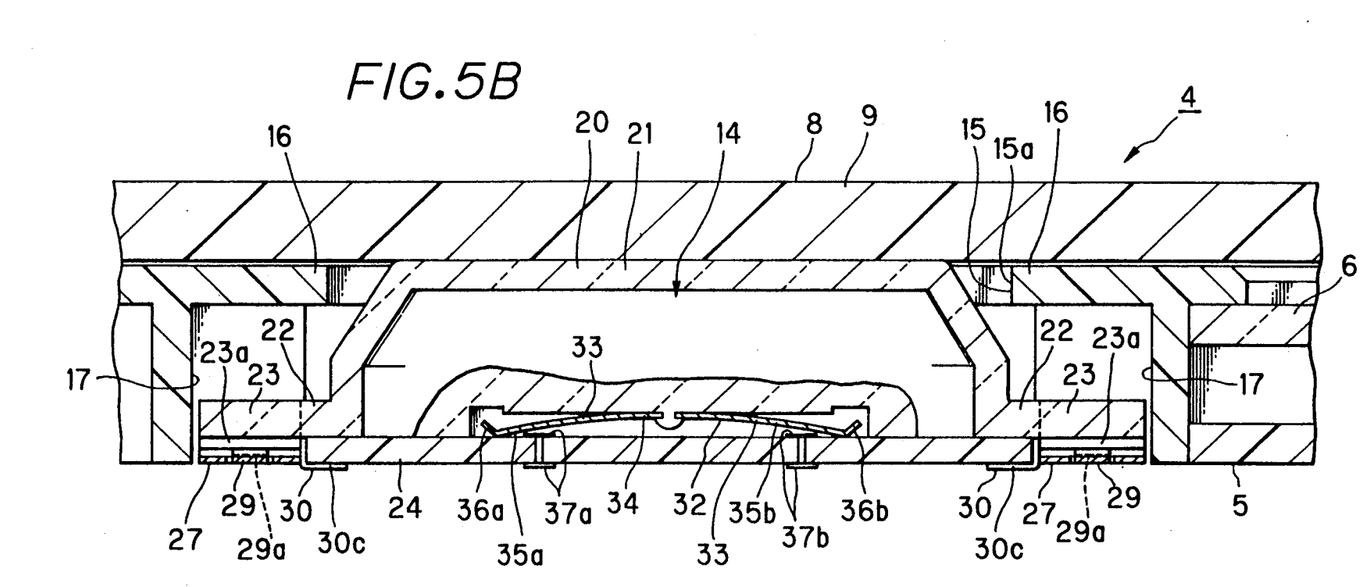
Figure 6:
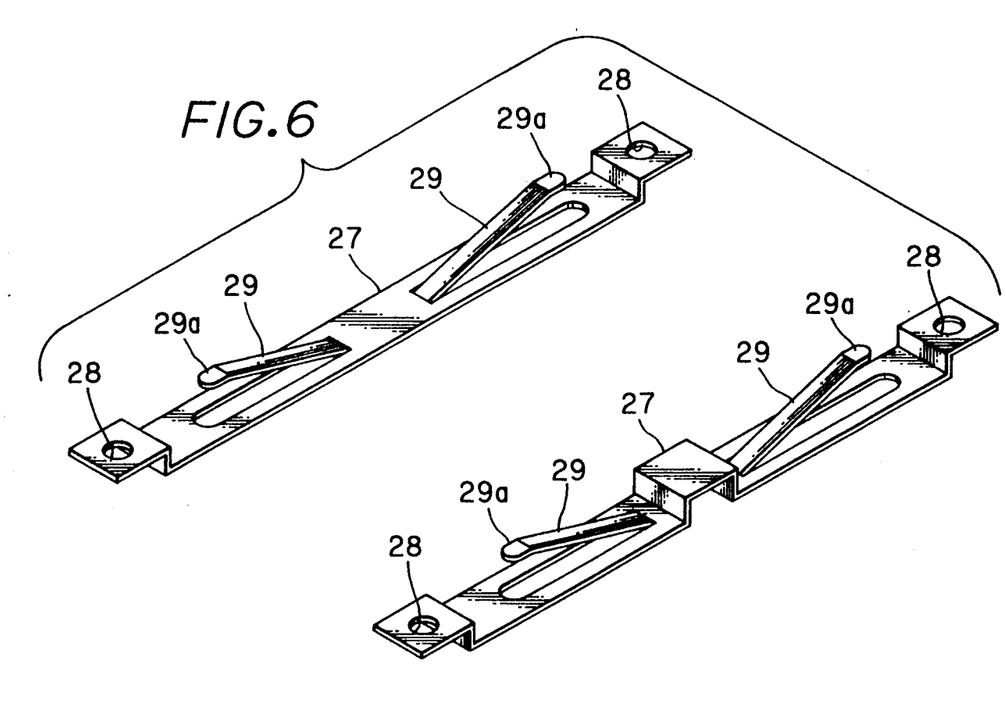
FIG. 6 is an enlarged perspective view showing lens retaining springs.
Figure 7:
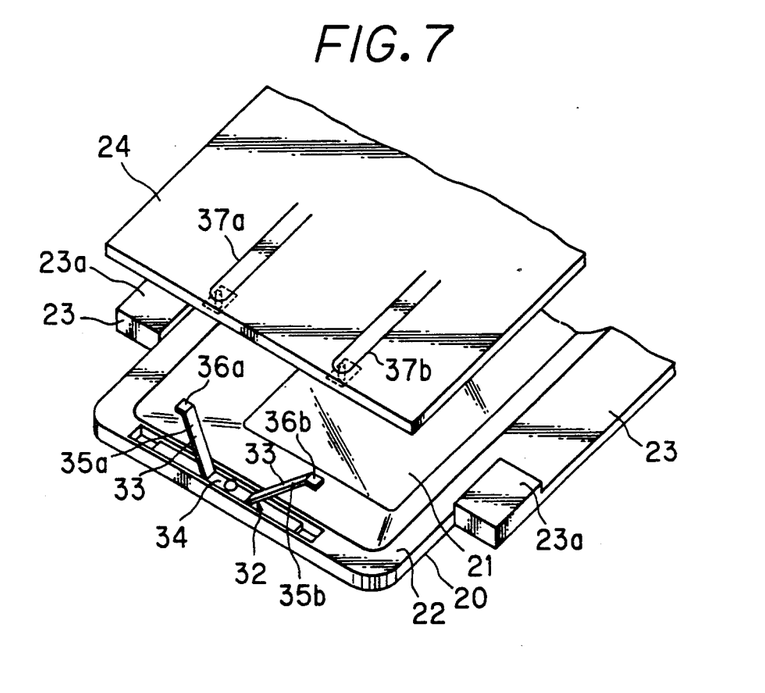
FIG. 7 is an exploded perspective view of switch portion.
Figure 8:
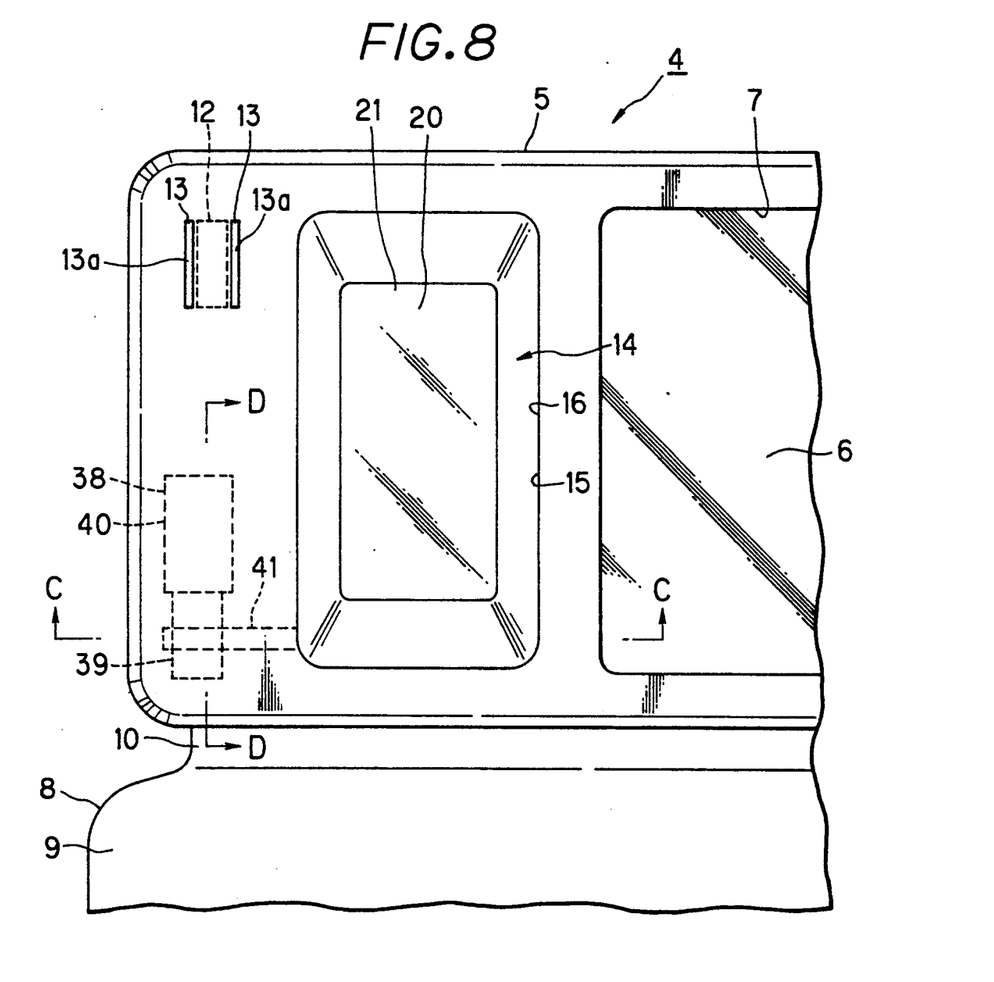
FIG. 8 is a partially broken front view of the essential portion.

When the lens 20 takes the projecting position, the contacting portions 36a and 36b of the terminal spring 33 resiliently contact with end portions of the printed conductors 37a and 37b respectively and separately as shown in FIG. 5a. Thus, the printed conductors 37a and 37b are connected through the terminal spring 33 and the lamp 26 is turned on. While, when the lens 20 moves to the retracted position, the leg portions 35a and 35b of the terminal spring are relatively pressed by the printed circuit board 24 such that the contacting portions 36a and 36b move in the directions separating from each other and separate from respective end portions of the printed conductors 37a and 37b. Thus, the printed conductors 37a and 37b separate and, the lamp 26 is extinguished.

FUNCTION

When the vanity mirror is in the non-use condition the cover 8 is closed, the lens 20 is in the retracted condition. The contacting portions 36a and 36b of the terminal spring 33 supported on the lens 20 are separated from the printed conductors 37a and 37b on the printed circuit board 24, and the lamp 26 is extinguished.

At this condition the lens 20 is located near to the lamp 26, but since the lamp 26 is extinguished the lens 20 does not suffer from the heat of the lamp 26, and the overall thickness in the fore and aft directions of the vanity mirror 4 can be minimized, and the vanity mirror 4 is particularly adapted to mount on a sun visor of a vehicle.

In use, when the cover 8 separates from the front surface of the body 5, the lens 20 moves to the projecting position and the contacting portions 36a and 36b of the terminal spring 33 supported on the lens 20 contact respectively with the printed conductors 37a and 37b on the printed circuit board 24, and the lamp 26 is lit. Although the lamp is lit, since the lens 20 is separated from the lamp 26 the heat of the lamp 26 does not affect on the lens 20.

The terminal spring 33 stores a large resilient force in the leg portions 35a and 35b when the lens 20 is in the retracted position, thus, the spring 33 acts also to bias forward the lens 20, which enables to reduce the resilient force of the lens retaining springs 27 and 27. It is possible to provide a spring similar to the terminal spring 33 on the lower end portion of the lens 20, then, it is possible to omit the lens retaining springs 27 and 27.

Figure 9:
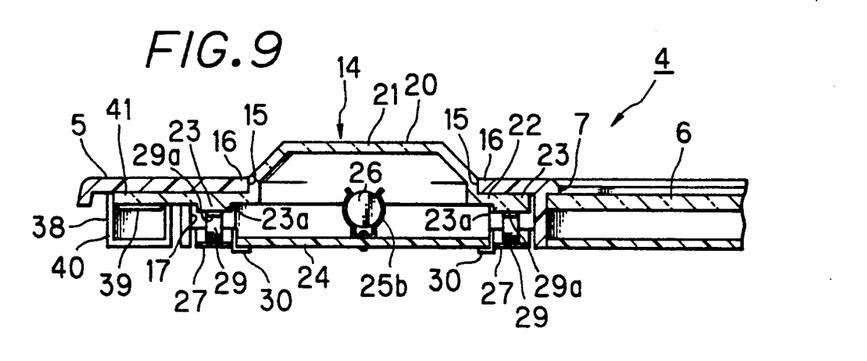
FIG. 9 is a section view taken generally along line C—C in FIG. 8.

MODIFIED FORM OF SWITCH (FIG. 9 AND FIG. 10)

In the vanity mirror 4, there is provided on the lens 20 a portion (terminal spring 33) of terminals of the switch 32 for actuating/deactuating the lamp 26, however, in the embodiment shown in FIGS. 9 and 10, a micro-switch is utilized as the main body of the switch, and the lens 20 is utilized also as a push button.

Shown at numeral 38 is a micro-switch disposed on the rear surface of the body 5 and along the recess portion 17 being located opposite to the mirror 6 with respect to the opening 15.

the micro-switch 38 comprises a casing 40 and a pressed piece 39 rotatably mounted on the casing 40 and a being biassed forward by bias means (not shown).

Figure 10A:
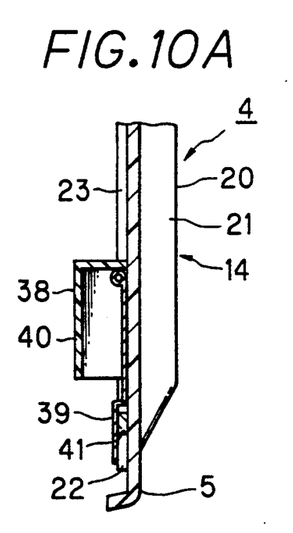
FIG. 10 is a section view taken along line D—D in FIG. 8, with FIG. 10(A) being in the open condition and FIG. 10(B) in the closed condition.

As shown in FIG. 10(A), when the pressed piece 39 of the micro-switch 38 is located along the rear surface of the body 5 the lamp 26 is lit or ON, and when the pressed piece 39 of the micro-switch 38 is moved rearward against the resilient force of the bias means the lamp 26 is extinguished or OFF.

Figure 10B:
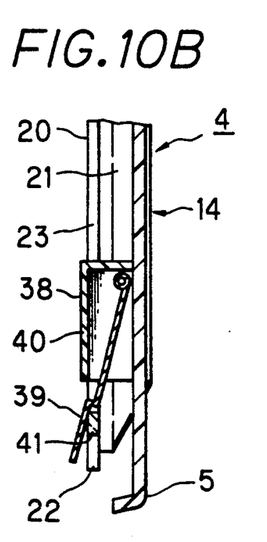

When the lens 20 takes the retracrted position, a pressing portion 41 provided on the lens 20 presses the pressed piece 39 of the micro-switch 38 rearward against the resilient force of bias means as shown in FIG. 10(B) thereby extinguishing the lamp 26. When the lens 20 moves to the projecting position as shown in FIG. 10(A) the pressing portion 41 of the lens 20 also moves forward and, thus, the pressed piece 39 rotates forward by the resilient force of bias means thereby litting the lamp 26.

ADVANTAGES OF THE INVENTION

As described in the foregoing, the vanity mirror according to the present invention is of the type including a mirror, an illuminating portion, and a cover for covering and disclosing the front surface of the mirror, with the cover acting also for controlling on/off of a lamp in the illuminating portion; and is characterized in that there is provided a lens covering the front side of the lamp and being displaceable in the fore and aft directions, and bias means for biassing forward the lens, and that the lens moves rearward by the closing of the cover and lens moves forward by the bias means in response to the opening of the cover.

Thus, according to the invention, when the lamp is lit the lens moves forward and separates from the lamp thereby minimizing the thermal effect of the heat of the lamp, and when the lamp is extinguished the lens moves rearward, which enables to reduce the thickness of the vanity mirror during the non-use condition.

It will be understood that various modifications, alternations and adaptations can be made for those skilled in the art from the content of the foregoing disclosure, and that the present invention is construed broadly and in a manner consistent with the fair meaning or proper scope of claims.

We claim:

1. A vanity mirror of the type including a mirror, an illuminating portion having a lamp, and a cover for covering and exposing a front surface of the mirror with the lamp being turned on and off in response to the opening and closing of the cover, wherein a lens covering a front side of the lamp is displaceable in fore and aft directions, there is provided means for biasing forward the lens and means for displacing the lens in response to the closing of the cover, whereby the lens is displaced forward in response to the opening of the cover and by the biasing means, and there is provided on the lens a pressing portion for actuating and deactivating a switch which controls the on-off of the lamp.

2. A vanity mirror of the type including a mirror, an illuminating portion having a lamp, and a cover for covering and exposing a front surface of the mirror with the lamp being turned on and off in response to the opening and closing of the cover, wherein a lens covering a front side of the lamp is displaceable in fore and aft directions, there is provided means for biasing forward the lens and means for displacing the lens in response to the closing of the cover, whereby the lens is displaced forward in response to the opening of the cover and by the biasing means, the lens is formed as a portion of a switch controlling the on-off of the lamp, such that when the lens moves rearward the lens is turned off and when the lens moves forward the lamp is turned on, and the switch for controlling the on-off of the lamp is constituted of a contact point formed on a printed circuit board supporting the lamp and a contact point provided on the lens.

3. A vanity mirror according to claim 2, wherein the contact point provided on the lens is formed of a sheet spring material for acting also as biasing means.

4. A vanity mirror according to claim 3, wherein the sheet spring material provided on the lens and acting as said contact point has inclined and separating two leg potions such that when the lens separates from the printed circuit board the tip ends of the two leg portions approach with one another and contact respectively with contact points provided on the printed circuit board and completes a circuit, and that when the lens approaches to the printed circuit board the tip ends of the two leg portions separate from each other whereby at least one of the tip ends separates from at least one of the contact points on the printed circuit board and a resilient force is stored in the contact point on the lens.

* * * * *